Aug. 7, 1945.  G. K. NEWELL  2,381,225
WHEEL-SLIP DETECTING DEVICE
Filed Oct. 31, 1941   2 Sheets-Sheet 1

INVENTOR
GEORGE K. NEWELL
BY
*A. M. Higgins*
ATTORNEY

Aug. 7, 1945.   G. K. NEWELL   2,381,225
WHEEL-SLIP DETECTING DEVICE
Filed Oct. 31, 1941   2 Sheets—Sheet 2

INVENTOR
GEORGE K. NEWELL
BY
A. M. Higgins
ATTORNEY

Patented Aug. 7, 1945

2,381,225

UNITED STATES PATENT OFFICE 2,381,225

WHEEL-SLIP DETECTING DEVICE

George K. Newell, near Pitcairn, Pa., assignor to The Westinghouse Air Brake Company, Wilmerding, Pa., a corporation of Pennsylvania Application October 31, 1941, Serial No. 417,366

8 Claims. (Cl. 264—11)

This invention relates to wheel-slip detecting devices for effecting operation of a signal device or for controlling the brakes associated with the wheels of a vehicle, such as a railway car, in a manner to prevent the sliding of the wheels.

As is well known, the application of the brakes to a vehicle wheel to a sufficient degree to exceed the limit of adhesion between the wheel and the road surface or rail on which the wheel rolls causes the wheel to decelerate at an abnormally rapid rate to a locked or non-rotative condition. Also, if propulsion torque is applied to the driving wheel of a vehicle to a degree sufficient to exceed the limit of adhesion between the wheel and the road surface or rail on which the wheel rolls, the wheel rotates at an abnormally rapid speed higher than the speed of travel of the vehicle.

In the present application, a vehicle wheel is said to "slip" when it rotates at a speed greater or less than a speed corresponding to the speed of the vehicle at a given instant, due to excessive propulsion torque or excessive braking respectively. A wheel is said to "slide" when it is dragged along a road surface or rail in a locked or non-rotative condition. The distinction between the terms "slip" and "slide" as employed herein, should be kept in mind.

When a wheel slips due to excessive braking, it is desirable to instantly and rapidly release or at least reduce the degree of application of the brakes associated with the wheel, in order to prevent the wheel from decelerating to a locked or non-rotative condition and sliding. The development of flat stops on the wheel, which are objectionable because of the expense involved in replacement or repair of the flat of the wheels, is thus prevented. Similarly, if the driving wheels of a vehicle slip due to excessive propulsion torque it is desirable to promptly remove or at least reduce the propulsion torque in order to restore the wheel to vehicle speed for otherwise the rims of the wheels are subject to excessive wear which is likewise objectionable.

Various types of devices have been proposed for recognizing the slipping condition of the wheel, due either to excessive braking or excessive propulsion torque, and operative to control the brakes or the propulsion motors in a manner to restore the slipping wheels promptly to vehicle speed.

It is an object of my present invention to provide a wheel-slip detecting device of novel construction adapted to detect slipping of a wheel, caused either by excessive braking or excessive propulsion torque.

It is another object of my invention to provide a wheel-slip detecting device of novel construction adapted to be associated with a single wheel or wheel unit and operatively responsive to slipping thereof.

It is another object of my invention to provide a novel wheel-slip detecting device adapted to be associated with a pair of separately rotating wheels and to register the slipping condition of either of the wheels by a comparison of the respective speeds of the two wheels.

It is another object of my invention to provide a novel wheel-slip detecting device of the type mentioned in one of the foregoing objects, associated with a single wheel or wheel unit and characterized by a novel type of over-running clutch device effective automatically for opposite directions of rotation of the wheel or wheel unit.

It is another object of my invention to provide a novel type of over-running clutch effective automatically regardless of the direction of rotation of the driving shaft.

The above objects, and other objects of my invention which will be made apparent hereinafter, are attained by several embodiments of my invention subsequently to be described and shown in the accompanying drawings, wherein.

Figure 1 is a diagrammatic view, in vertical section, of a wheel-slip detecting device embodying my invention and adapted to be associated with a single wheel or wheel unit, Figure 2 is a fragmental sectional view, taken substantially on the line 2—2 of Figure 1, showing further details of the switch mechanism, Figure 3 is an enlarged sectional view, taken substantially on the line 3—3 of Figure 1, showing details of construction of the over-running clutch device, Figure 4 is a diagrammatic view, in vertical section, showing a modified form of device adapted for use in connection with two separately rotating wheels or wheel units, and Figure 5 is a simplified diagrammatic view, illustrating the manner in which either of the devices shown in Figure 1 or Figure 4 may be employed to operate a signal device or to control the brakes associated with a vehicle wheel.

*Description of embodiment shown in Figure 1*

Figure 1:
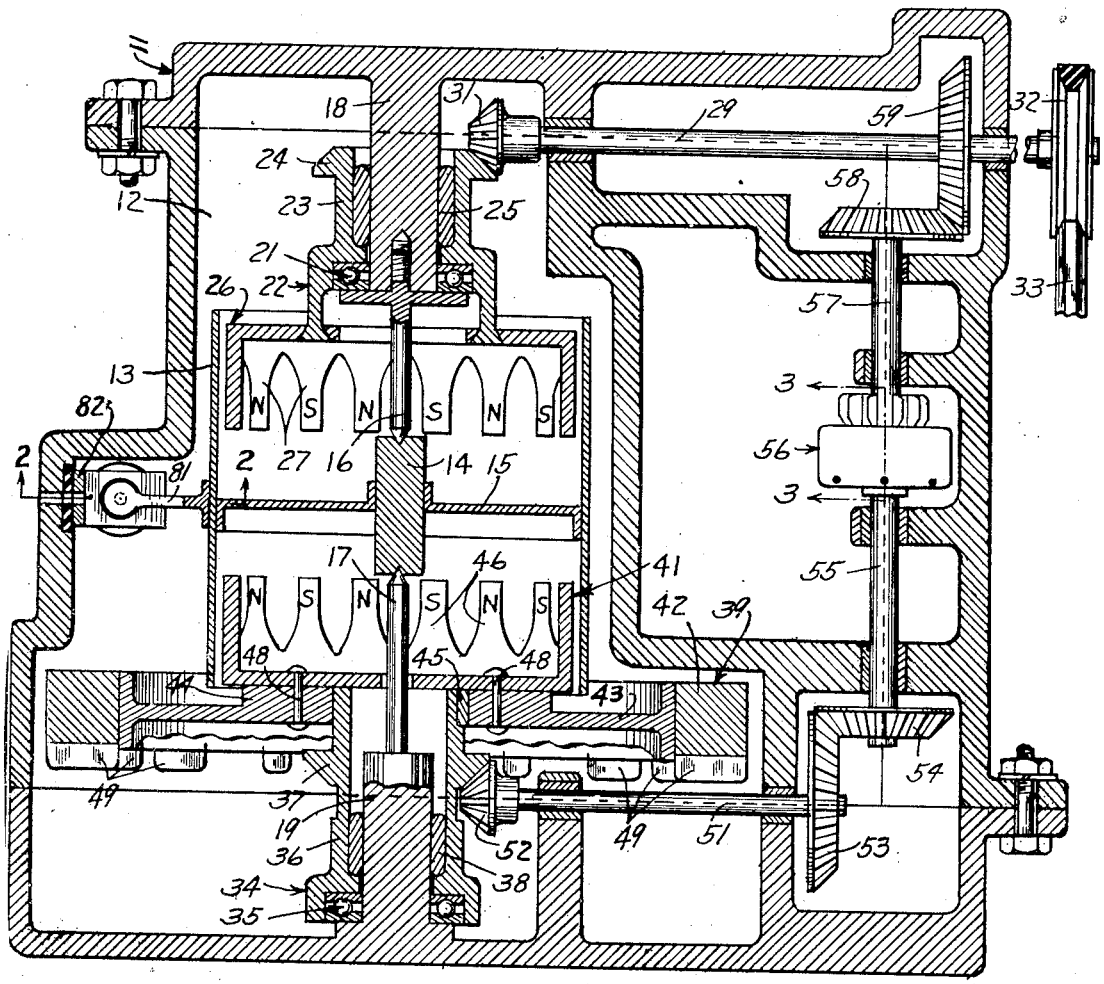
Figure 2:
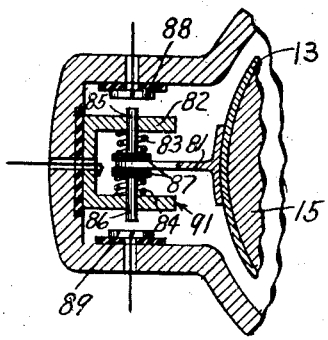

The wheel-slip detecting device shown in Figure 1 comprises a suitable casing 11 having a chamber 12 formed therein in which is contained a rotary armature member 13, subsequently referred to simply as the armature. The armature 13 is preferably cylindrical in form and may be fabricated out of relatively thin sheet metal, such as aluminum or an alloy thereof, so as to be relatively light in weight. The armature 13 also comprises a hub 14 adapted to be supported in coaxial relation to the longitudinal axis of the armature by means of an annular web 15 suitably attached as by welding it at the outer and inner peripheries to the armature and hub, respectively.

The armature 13 is journaled for rotative movement within the casing by means of two spindles or pin supports 16 and 17 having conical ends adapted to engage in suitable conical recesses formed in the hub 14. If desired, suitable jewelled bearings may be employed for providing a substantially frictionless support of the armature on the pins 16 and 17.

The pins 13 are supported in coaxial relation to each other by attaching them in suitable manner to projecting bearing pedestals 18 and 19 respectively, which pedestals may be attached to or formed integrally with the casing 11.

Rotatively supported on a thrust bearing 21, shown as of the ball type, carried at the lower end of the bearing pedestal 18 is a rotating member 22. The rotating member 22 comprises a cylindrical or sleeve portion 23 of non-magnetic material such as brass or suitable alloys thereof and having a bevel gear 24 formed at the upper end thereof. The inner bore of the sleeve 23 is larger in diameter than that of the bearing pedestal 18 and a suitable guide bearing 25 of either the sleeve or needle type, is interposed for the purpose of maintaining the sleeve 23 in concentric surrounding relation to the bearing pedestal 18.

The rotating member 22 further comprises a cup-shaped member 26 of magnetic material which is secured as by swaging suitable projections at the lower end of the sleeve 23 in holes formed in the web of the magnetic member 26.

The mganetic member 26 has a plurality of fingers or pole-pieces, 27, at substantially equally spaced intervals around the periphery and in closely spaced parallel relation to the inner bore of the armature 13 at the upper end thereof. The pole-pieces 27 are suitably magnetized so as to form permanent magnets alternately of north and south polarity, as indicated by the capital letters N an S respectively.

Suitably journaled in the casing and extending to the exterior thereof is a shaft 29 having a bevel pinion 31 at the inner end thereof which meshes with the bevel gear 24 on the sleeve 23. The shaft 29 is rotated in accordance with the rotation of a vehicle wheel as by a pulley 32 fixed on the outer end of the shaft and an endless belt 33 connecting the pulley 32 to a similar pulley (not shown) rotated according to the rotation of a vehicle wheel.

In this connection, although the shaft 29 is described as rotated according to the rotation of a vehicle wheel, it should be understood that it may be rotated in accordance with the rotation of any other rotary element depending on the purpose for which the device is to be used.

The device further comprises a second rotating member 34 which is supported for rotation in concentric relation to the lower bearing pedestal 19 on a lower thrust bearing 35 indicated as of the ball type.

The rotating member 34 comprises a sleeve member 36 of suitable non-magnetic material such as aluminum or alloys thereof, and having a bevel gear 37 formed thereon. The sleeve 36 is maintained in concentric relation to the bearing pedestal 19 by means of a suitable guide bearing 38 of either the sleeve or needle type.

The rotary member 34 further comprises a fly-wheel 39 and a cup-shaped member 41 of magnetic material similar to the magnetic member 26.

The fly-wheel 39 is made up of an outer ring of steel or other relatively heavy material shrunk or press-fitted over an annular web member 43 of non-magnetic material such as brass or aluminum. The web member 43 comprises a hub portion 44 adapted to be secured as by a key 45 to the upper end of the sleeve member 36.

The cup-shaped member 41, like the member 26, has a plurality of peripherally spaced pole-pieces 46 which are permanently magnetized into alternate North and South poles and which extend upwardly from the lower end of the armature 13 in close parallel relation to the inner bore of the armature. The cup-shaped magnetic member 41 is secured, as by a plurality of rivets 48, to hub portion 44 of the fly-wheel 39.

The fly-wheel 39 is provided with a plurality of substantially equally spaced radially extending damping vanes 49. The vanes 49 may be of relatively thin sheet material, such as brass or aluminum, brazed or otherwise suitably secured in slots cut in the lower face of the steel ring 42. The purpose of the vanes 49 will be made apparent hereinafter.

The rotating member 34 is adapted to be rotated by rotation of the shaft 29 through an intervening shaft and gear mechanism in such a manner that the magnetic members 26 and 41 rotate simultaneously in opposite directions upon rotation of the shaft 29.

The shaft and gear mechanism for driving the rotary member 34 from the shaft 29 may comprise a shaft 51 suitably journalled in the casing and having a bevel pinion 52 fixed at one end thereof and meshing with the bevel gear 37 on the sleeve member 36. A bevel gear 53 fixed at the opposite end of shaft 51 meshes with a similar bevel gear 54 fixed on one end of another shaft 55 suitably journalled in the casing. The shaft 55 is connected through an over-running clutch device 56, constituting a part of my invention, to another shaft 57 which is suitably journalled in the casing. Shaft 57 has a bevel gear 58 fixed thereon which meshes with another bevel gear 59 fixed on the shaft 29.

Figure 3:
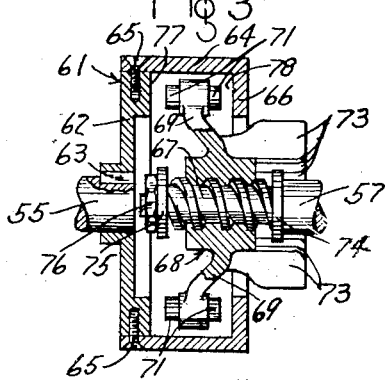

Referring to Figure 3, the over-running clutch device 56 comprises an annular channel member 61 made up of an annular web member 62 having a hub which is secured as by a key 63 to the shaft 55, hereinafter referred to as the driven shaft, and a cylindrical member 64 secured to the outer periphery of the web member 62, as by a plurality of screws 65, and having at the opposite end a radially inwardly extending flange 66.

Formed on the end of the shaft 57, hereinafter referred to as the driving shaft, is a suitable threaded portion 67 which carries a cooperating travelling nut member 68. The travelling nut member 68 is provided with a plurality of arms 69, shown illustratively as two in number, each arm carrying at the extremity thereof suitably oppositely-facing friction members or shoes 71.

The travelling nut member 68 has a plurality of damping vanes 73 which are suitably fixed thereto in radially extending concentric surrounding relation to the driving shaft 57. The flange 66 on the member 64 is sufficiently large in diameter to permit the vanes 73 to pass through the flange when the web member 62 and the member 64 are secured together.

An annular shoulder 74 is formed on the driving shaft 57 at the inner extremity of the threaded portion 67. The outer extremity of the threaded portion 67 is provided with a threaded portion of reduced diameter for receiving a suitable washer 75 and a nut 76. The travel of the travelling nut member 68 is thus limited to the distance between the annular shoulder 74 and the washer 75. This distance is, however, greater than the distance between the axially spaced radially extending annular clutch faces 77 and 78 formed on the members 62 and 64 respectively, in order that the friction members 71 carried by the travelling nut member 68 may engage either of the clutch faces 77 or 78 depending upon which direction the travelling nut member is shifted.

The travelling nut member 68 is made of relatively light metal, such as aluminum, but the damping vanes 73 impart the equivalent of an inertia effect thereto. Thus, when the driving shaft 57 is accelerated in speed while rotating in a clockwise direction, as viewed from the right-hand end of Figure 3, the travelling nut member 68 is caused to be shifted in the right-hand direction so that the friction members 71 engage the clutch face 78 on the flange 66. Obviously, therefore, the channel member 61 and the driven shaft 55 connected thereto are thus rotated in accordance with the rotation of the shaft 57.

It will be apparent that the force with which the friction members 71 are pressed to the clutch face 78 on the flange 66 will vary with the rate of acceleration of the driving shaft 57 that is the greater the acceleration of the driving shaft 57 the greater is the force with which the friction member 71 engage the clutch face 78. Thus the driven shaft 55 is accelerated, without undue slippage at the higher rates of acceleration of the driving shaft 57.

If the driving shaft 57 is rotated in a counter-clockwise direction, viewed from the right-hand end of Figure 3, the travelling nut member 68 is caused to be shifted in the left-hand direction until the friction members 71 engage the clutch face 78 on the member 62.

It will thus be seen that the clutch device 56 automatically establishes a connection between the driving shaft 57 and the driven shaft 55 for either direction of rotation of the driving shaft 57. Further operating characteristics of the clutch device 56 can best be explained in connection with the operation of the entire device and such explanation will therefore be given at such time hereinafter.

It will be apparent upon analysis of the direction of rotation of the various shafts 29, 57, 55, and 51 that the rotary members 22 and 34 rotate in opposite directions simultaneously.

It will also be apparent that due to the construction of the magnetic members 26 and 41, the rotation of each magnetic member sets up eddy currents in the armature 13, which eddy currents set up a magnetic flux reacting with the magnetic flux emanating from the North and returning to the South poles of the magnetic member in such a manner that a torque is exerted tending to turn the armature 13 in the same direction as the direction of rotation of the magnetic member and with a force which is substantially proportional to the speed of rotation of the magnetic member.

In view of the fact that the magnetic members 26 and 41 rotate simultaneously in opposite directions, respectively, it will be seen that opposing and substantially equal torque forces are exerted on the armature 13 as long as the two magnetic members 26 and 41 rotate at the same speed. If one of the magnetic members 26 or 41 rotates sufficiently faster than the other, an unbalanced torque force thus becomes effective to displace the armature 13 rotarily out of a certain normal position in which it is maintained by means presently to be described.

The armature 13 is normally maintained in a certain rotary position by means of an arm 81 fixed as by welding to the outer surface of the armature member, and centered between the arms of a U-shaped member 82 of brass or other conducting metal, attached in insulated relation to the casing 11, by means of two centering springs 83 and 84. The springs 83 and 84 do not engage the arm 81 directly but act through slideable plungers 85 and 86 respectively, which are provided with insulating disks 87 between which the outer end of the arm 81 is held.

Carried by the casing 11 in insulated relation thereto are a pair of contacts 88 and 89 located so as to be engaged respectively by the plungers 85 and 86 upon rotary displacement of the armature 13 in opposite directions out of its normal position.

The centering mechanism just described may thus form a switch mechanism by the simple expedient of connecting a wire to the U-shaped member 82 and separate wires to each of the contact members 88 and 89. This switch mechanism is designated generally by the reference numeral 91 and the manner in which the switch mechanism 91 may be employed for signal or brake control purposes is shown in simplified manner in Figure 5.

Figure 5:
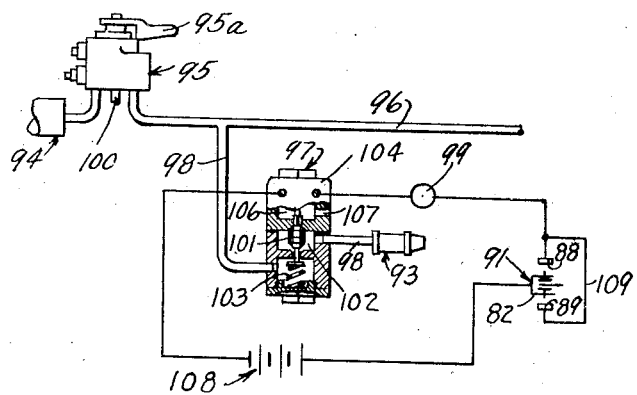

Referring to Figure 5, a simplified brake control equipment is shown comprising a brake cylinder 93 effective upon the supply of fluid under pressure thereto to cause application of the brakes associated with a vehicle wheel and upon the release of fluid under pressure therefrom to effect release of the brakes the intervening brake levers and rigging being omitted for simplicity; a fluid reservoir 94 adapted to be charged to a certain normal pressure by means of a fluid compressor not shown; a brake valve 95 of the self-lapping type; a train-pipe 96, hereinafter referred as the control pipe; and a magnet valve device 97 interposed in a branch pipe 98 of the control pipe to control the supply of fluid under pressure to and the release of fluid under pressure from the brake cylinder 93.

The brake valve 95 is of the type similar to that described in detail and claimed in Patent No. 2,042,112 to Ewing K. Lynn and Rankin J. Bush. Briefly the brake valve 95 comprises a brake valve handle 95a shiftable in a horizontal plane to effect rotary movement of a rotary operating shaft which in turn controls the operation of suitable supply and release valves. In the normal or brake release position of the brake valve handle 95a, the brake valve 95 causes fluid under pressure to be released to atmosphere from the control pipe 96 through an exhaust port or pipe 99 at the brake valve. When the brake valve handle is shifted out of its brake release position into its application zone, fluid under pressure is supplied to the control pipe. The nature of the self-lapping valve mechanism of the brake valve 95 is such that the pressure established in the control pipe is substantially proportional to a degree of displacement of the brake valve handle out of its brake release position. Moreover, the brake valve possesses a pressure-maintaining feature in that if the pressure of the fluid in the control pipe 96 reduces for some reason such as leakage the brake valve mechanism is automatically operative to supply fluid to maintain a pressure in the control pipe corresponding to the position of the brake valve handle.

The magnet valve 97 is a standard type comprising a double-beat valve 101 contained in a chamber 102, which valve is normally biased to an upper seated position by a spring 103 and actuated to a lower seated position in response to energization of an electromagnet winding or solenoid 104.

The brake cylinder 93 is connected to the chamber 102 as by one section of the branch pipe 98. In its upper seated position, the valve 101 establishes communication between chamber 102 and the section of pipe 98 connected to the control pipe 96, thereby establishing communication through the pipe 98 so that fluid under pressure may be supplied to and released from the brake cylinder 93 in response to variations of pressure in the control pipe 96.

In its lower seated position, the valve 101 closes communication through the branch pipe 98 and establishes communication between the chamber 102 and a chamber 106 which is constantly connected to atmosphere through an exhaust port 107. Thus, in the lower seated position of the valve 101, fluid under pressure is rapidly exhausted from the brake cylinder 93 to effect the rapid release of the brakes.

The switch mechanism 91 may be employed in a simple series circuit readily apparent in Figure 5, including therein a suitable source of current, such as a storage battery 108, the magnet winding 104 of the magnet valve 97, and a signal device 99 which may be of either the audible or visible type. The two contacts 88 and 89 are connected by a wire 109 so that the circuit is completed in response to sufficient rotary displacement of armature 13 in either direction out of its normal position.

It will thus seen that as long as the switch mechanism 91 interrupts the circuit of the magnet winding 104 of the magnet valve 97, the brakes may be controlled in the usual manner by the operator by means of the brake valve 95. When the switch mechanism 91 completes the circuit and causes energization of the magnet winding 104, however, the supply of fluid under pressure to the brake cylinder 93 is cut-off and fluid under pressure is rapidly exhausted from the brake cylinder, the exhaust of fluid under pressure from the brake cylinder continuing as long as the switch mechanism 91 is closed.

*Operation of embodiment shown in Figure 1*

Let it be assumed that a vehicle, such as a railway car, provided with the wheel-slip detecting device shown in Figure 1 is travelling under power and that the operator desires to apply the brakes and bring the car to a stop. To do so the operator first shuts off the propulsion power and then operates the brake valve handle 95a to cause the supply of fluid under pressure to the brake cylinder 93 thereby effecting application of the brakes associated with the wheel driving the shaft 29 of the device. As previously explained, as long as the magnetic members 26 and 41 rotate at the same speed, the armature member 13 remains stationary in its normal position. Thus while the car wheel driving the shaft 29 rotates at a constant speed, the torque forces on the armature 13 are balanced because the magnetic members 26 and 41 are rotated at the same speed. Consequently the switch mechanism 91 is in open position and the operator may vary the degree of the brake application by varying the pressure in the control pipe 96.

When the vehicle wheel driving the shaft 29 decelerates, however, the inertia in the fly-wheel 39 tends to maintain the magnetic member 41 at a speed higher than the speed of rotation of the magnetic member 26. Due to the damping vanes 49 carried by the fly-wheel, however, the fly-wheel is decelerated at a rate corresponding to a certain normal rate of deceleration of the car, such as four miles per hour per second. Therefore, as long as the vehicle wheel does not decelerate at a rate in excess of four miles per hour per second, the fly-wheel 39 and the magnetic member 41 will rotatively decelerate in unison with the magnetic member 26, so that substantially equal and opposing torques are constantly exerted on the armature. Accordingly, as long as the vehicle wheel decelerates at a normal rate not exceeding a certain rate, such as the four miles per hour per second, the armature 13 is not displaced out of its normal position.

If during a brake application, the wheel driving the shaft 29 begins to slip and consequently decelerates at an abnormally rapid rate greatly exceeding a rate which is the equivalent of four miles per hour per second deceleration of the car, the fly-wheel 39 causes the magnetic member 41 to be maintained at a higher instantaneous speed than that of the magnetic member 26 because the magnetic member 26 decelerates rotatively at a higher rate than does magnetic member 41.

It will be apparent that the driven shaft 55 is automatically disconnected from the driving shaft 57 to permit fly-wheel 39 to over-run the shaft 57. This is so because the friction of the clutch face 78 on the friction members 71 carried by the travelling nut member 68 tends to cause the travelling nut member to rotate faster than the driving shaft 57 and consequently the travelling nut member 68 is backed away in the left-hand direction from the clutch face 78 to effect the disconnection of the driving shaft 57 from the driven shaft 55.

Due to the braking effect of the damping vanes 73 on the travelling nut member 68, however, the travelling nut member 68 is merely shifted to a neutral position between and out of engagement with the two clutch faces 77 and 78 and is not shifted sufficiently in the left-hand direction for the friction members 71 to engage the clutch face 77.

Accordingly when the car wheel begins to slip, the driving and driven shafts 57 and 55 are automatically disconnected, thereby permitting the fly-wheel 39 to cause rotation of magnetic member 41 faster than the magnetic member 26.

When the car wheel slips, therefore, the momentary rotation of the magnetic element 41 at a speed which is at least a predetermined amount higher than the speed of magnetic element 26 produces an unbalanced torque on the armature 13 which causes it to be rotatively displaced in the direction of rotation of the magnetic member 41 to effect engagement of either of the plunger contacts 85 or 86 with the corresponding contact 88 or 89, depending upon the direction of rotation of the vehicle wheel.

The switch mechanism 91 is thus operated to closed position to effect a rapid release of fluid under pressure from the brake cylinder 93 and the consequent rapid release of the brakes associated with the car wheel, in the manner previously described in connection with Figure 5, only when the wheel begins to slip.

Upon the reduction in the degree of application of the brakes caused by operation of the switch mechanism 91 to closed position, the slipping wheel ceases to decelerate and begins to accelerate rapidly back toward a speed corresponding to car speed without reducing in speed to a locked or non-rotative condition and sliding. Accordingly, the travelling nut member 68 of the over-running clutch device 56 is again shifted in a right-hand direction to effect the engagement of friction members 71 with the clutch face 78. Since the fly-wheel 39 is momentarily rotating at a faster speed than the shaft 29 and the car wheel it will be apparent that the engagement of the friction members 71 with the clutch face 78 will exert a braking effect on the fly-wheel causing it to be reduced in speed and thus synchronized with the car wheel so that when the car wheel is completely restored to a speed corresponding to car speed, the fly-wheel 39 is not rotating at a faster speed than the car wheel.

It will thus be seen that the clutch device 56 assists the damping vanes 49 on the fly-wheel to prevent the fly-wheel 39 from rotating faster than a speed corresponding to car speed at the instant the car wheel is restored to a speed corresponding to car speed. It should be apparent that if the fly-wheel 39 were permitted to rotate faster than a speed corresponding to car speed, when the car wheel is restored to a speed corresponding to car speed, the armature 13 might be displaced sufficiently to effect operation of the switch mechanism 91 and a consequent undesired release of the brakes due to the momentary higher speed of magnetic member 41 with respect to that of magnetic member 26. Reapplication of the brakes on the slipping wheel would thus be delayed unduly which would tend to lengthen the stopping distance. The operation of the clutch device 56 in exerting a braking effect on the fly-wheel 39 in response to acceleration of the slipping car wheel back toward vehicle speed during the slipping interval thus serves to positively prevent undesired and improper operation of the wheel-slip detecting device.

As the slipping car wheel is accelerating back toward a speed corresponding to car speed, the braking action on the fly-wheel exerted by the damping vanes 49 and clutch device 56 thus causes the magnetic member 41 to be reduced to a speed corresponding to the speed of the magnetic member 26 after which the two magnetic members are rotatively accelerated in unison as the slipping car wheel continues to be restored toward car speed.

It will thus be apparent that at some time during the acceleration of the slipping car wheel back toward a speed corresponding to car speed, the torque forces on the armature 13 again become balanced and the armature 13 is correspondingly restored to its normal rotative position causing opening of the switch mechanism 91.

Upon the deenergization of the magnet winding 104 of the magnet valve 97, resulting from the opening of the switch mechanism 91, the exhaust communication for the brake cylinder 93 is closed and the supply communication between the control pipe 96 and the brake cylinder is again restored. Reapplication of the brakes on the slipping wheel is thus initiated while the slipping wheel is accelerating back toward car speed.

Due to the resupply of fluid under pressure to the brake cylinder 93, the pressure in the control pipe 96 tends to reduce but due to the pressure maintaining feature of the brake valve 95, fluid under pressure is automatically supplied to the control pipe to maintain a pressure therein corresponding to the position of the brake valve handle. Thus, the brakes are reapplied on the slipping wheel to a degree corresponding to the pressure established in the control pipe 96. Due to the time required to build up the pressure in the brake cylinder 93, however, the slipping-wheel will have been restored fully to car speed before the full pressure is restored in the brake cylinder. Accordingly, it is unlikely that the reapplication of the brakes will initiate slipping of the car wheel again prior to its full restoration to car speed. The possibility of the wheel actually reducing to a locked or non-rotative condition and sliding is negligible.

After the slipping wheel has been restored fully to car speed it will of course be decelerated in accordance with the deceleration of the car, but unless the wheel again begins to slip, the armature 13 of the wheel-slip detecting device is not displaced to effect closure of the switch mechanism 91. Should the car wheel again begin to slip after being restored fully to car speed, the above operation is repeated, so that at no time is the car wheel permitted to be reduced in speed to a non-rotative condition and slide.

It will be apparent that the clutch device 56 functions in a similar manner regardless of the direction of rotation of the car wheel and consequently of the direction of rotation of the driving shaft 57. In the previous example, it was assumed that the travelling nut member 68 was shifted in the right-hand direction in response to the rotation of the driving shaft 57. Obviously, if the direction of rotation of the driving shaft 57 is reversed in correspondence with reversal of direction of rotation of the car wheel, the travelling nut member 68 will be shifted in the left-hand direction to effect engagement of the friction members 71 with clutch face 77. Moreover, upon a slipping of the car wheel, the tendency of the fly-wheel 39 to over-run the wheel will cause the travelling nut member 68 to be backed away from the clutch face 77 in a right-hand direction to disengage the driving and driven shafts 57 and 55. In such case, the damping vanes 73 carried by the travelling nut member 68 function as before to exert a braking effect thereon to prevent sufficient travel of the travelling nut member 68 in the right-hand direction to effect engagement of the friction members 71 with the clutch face 78.

The acceleration of the slipping wheel back toward a speed corresponding to car speed causes the travelling nut member 68 to be shifted again in a left-hand direction so as to effect engagement of the friction members 71 and the clutch face 77 to exert a braking effect on the fly-wheel 39.

Thus the clutch device 56 functions independently of the direction of rotation of the car wheel to permit momentary over-running of the magnetic member 41 with respect to the magnetic member 26 while the car wheel is slipping.

It will be seen that, while I have described the device shown in Figure 1 in connection with a brake control equipment for vehicle wheel, such device may be employed in other applications wherever it is desired to detect the rate of rotative deceleration of a rotary shaft or rotary element in excess of a certain rate.

Figure 4:
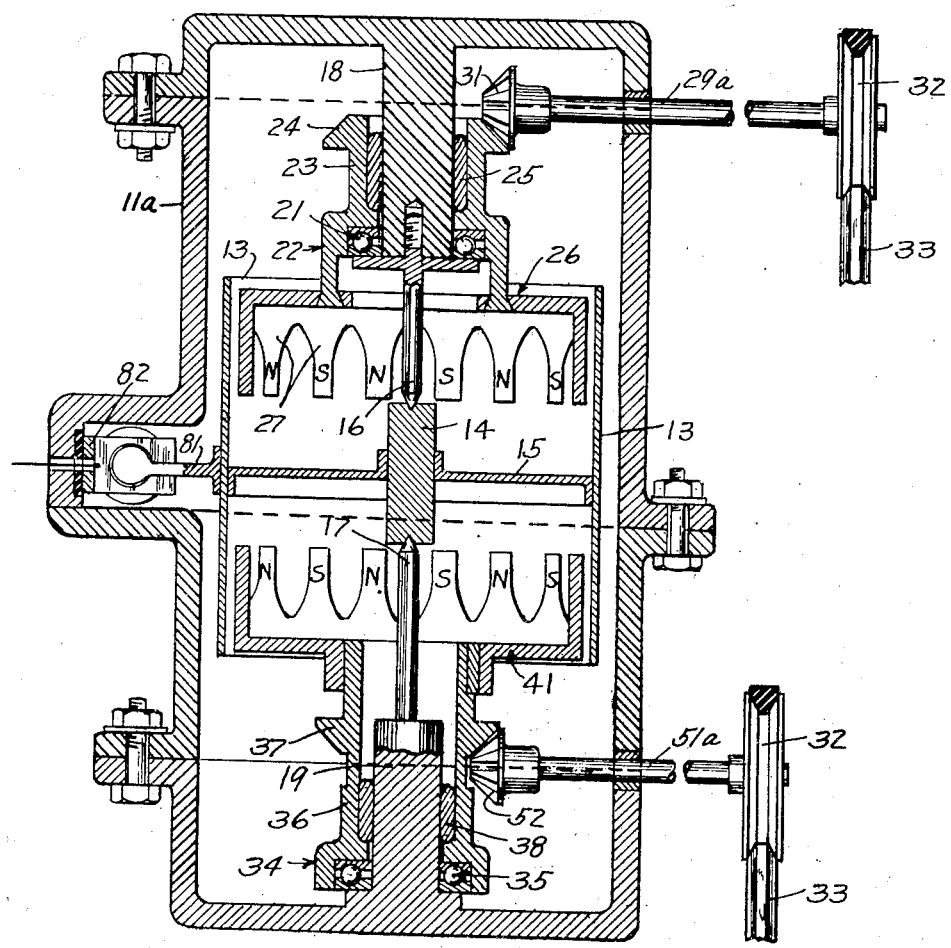

*Description of embodiment shown in Figure 4*

Referring to Figure 4, there is shown a modified form of wheel-slip detecting device adapted particularly for use in connection with two separately rotating elements, such as the two separately rotating wheels or wheel units of a railway car truck. The device shown in Figure 4 is similar in part to the device shown in Figure 1 and corresponding parts in the two devices are designated by the same reference numerals without further description.

The device shown in Figure 4 differs from that of Figure 1 in the omission of the fly-wheel 39 from the rotary element 34 and the separate rotation of the two rotary elements 22 and 34 simultaneously in opposite directions by rotation of two separately rotating shafts 29a and 51a suitably journaled in the casing 11a. As shown each of the shafts 29a and 51a may extend to the exterior of the casing, where each has a pulley 32 fixed thereon adapted to be driven through a corresponding endless belt 33 from a corresponding separately rotative shaft or element, such as a separately rotating vehicle wheel.

*Operation of embodiment shown in Figure 4*

Whenever one of the shafts 29a or 51a is rotated sufficiently faster than the other, as when one wheel slips while the other does not, the unbalanced torque force exerted by the corresponding rotary magnetic member 26 or 41 on the armature 13 causes it to be shifted in the corresponding direction to effect closure of the switch mechanism 91.

The device shown in Figure 4 is equally adapted to the control of brakes or to the control of the propulsion devices associated with driving wheels of a vehicle because it responds either to acceleration or deceleration of the two magnetic members 26 and 41 at different rates.

If the device is associated with two separately rotating vehicle wheels in a manner to control the brakes associated with those wheels, the slipping of either of the wheels will cause operation of the device to cause closure of the switch mechanism 91. In such case, release of the brakes associated with the wheels may be effected in a manner similar to that described in connection with Figure 5. Obviously, the centering springs 83 and 84 for the armature 13 may be so designated as to prevent sufficient displacement of the armature to effect closure of the switch mechanism 91 when the two car wheels rotate at slightly different speeds due to differences in wheel diameter.

If the device shown in Figure 4 is used in connection with the propulsion control equipment associated with driving wheels of a vehicle, the slipping of one or the other of the wheels due to excessive propulsion torque causes the corresponding magnetic member 26 or 41 to be rotated at a faster speed than the other and thus the armature 13 will be displaced correspondingly to effect closure of the switch mechanism 91. In such case, the switch mechanism 91 may be so arranged as to cause a reduction of the power supply or of the fuel supply to the propulsion motors driving the vehicle wheels so as to cause the slipping wheels to be promptly reduced to car speed.

It will be seen that the device in Figure 4 functions similarly for opposite directions of rotation of the car wheels because both shafts 29a and 51a automatically reverse their direction of rotation so that they at all times rotate in opposite directions.

*Summary*

Summarizing, it will be seen that I have disclosed two types of devices for detecting the slipping condition of a vehicle wheel, one of which devices is adapted to be associated with a single wheel or wheel unit and the other of which is adapted to be associated with two separately rotating wheels or wheel units. Both devices, however, are similar in construction in that they both have a rotary armature member which is subject in opposing relation to the torque forces exerted thereon by two separately rotating magnetic members and shifted out of a normal position only in response to a sufficient unbalanced torque force caused by the rotation of one of the magnetic members at a sufficiently faster speed than the other.

In the device adapted to function in connection with a single car wheel, I have provided an over-running clutch of novel construction functioning to permit a fly-wheel associated with one of the magnetic members to drive such magnetic member at a faster speed than the other magnetic member upon a sufficient rate of deceleration of the car wheel. This over-running clutch functions for both directions of rotation of a driving shaft and is effective inherently to exert a braking effect on the fly-wheel to prevent the undesired over-running of the fly-wheel with respect to the driving shaft when a slipping wheel is restored to car speed.

Having now described my invention, what I claim as new and desire to secure by Letters Patent, is:

1. A device for detecting the rate of deceleration of a rotary element said device comprising, in combination, a rotary armature member, a first magnetic member associated with said rotary armature member and effective upon rotation to cause a torque to be exerted on said armature tending to rotate it in a corresponding direction and with a force substantially proportional to the speed of rotation of said first magnetic member means for causing rotation of said first magnetic member at all times substantially in accordance with the rotation of said rotary element, a second magnetic member associated with said rotary armature member in a manner to cause a torque to be exerted thereon tending to rotate it in a corresponding direction and with a force substantially proportional to the speed of rotation of said second magnetic member, a fly-wheel rotatable with said second magnetic member, means for causing rotation of said second magnetic member and said fly-wheel in response to rotation of said rotary element in such a manner as to cause said first magnetic member and said second magnetic member to be rotated simultaneously in opposite directions respectively and at the same speed as long as the rotary element rotates at a constant speed, said last means including means whereby said second magnetic member and said fly-wheel may rotate faster than said first magnetic member when said rotary element rotatively decelerates at a rate exceeding a certain rate, said second magnetic member being effective while rotating at least a predetermined amount faster than said first magnetic member to cause an unbalanced torque force to be exerted effective to displace said armature member out of its normal stationary position, and means operatively responsive to the movement of said armature member.

2. A device for detecting the rate of deceleration of a rotary element said device comprising, in combination, a rotary armature member, a first magnetic member associated with said rotary armature member and effective upon rotation to cause a torque to be exerted on said armature tending to rotate it in a corresponding direction and with a force substantially proportional to the speed of rotation of said first magnetic member means for causing rotation of said first magnetic member at all times substantially in accordance with the rotation of said rotary element, a second magnetic member associated with said rotary armature member in a manner to cause a torque to be exerted thereon tending to rotate it in a corresponding direction and with a force substantially proportional to the speed of rotation of said second magnetic member, a fly-wheel rotatable with said second magnetic member, means for causing rotation of said second magnetic member and said fly-wheel in response to rotation of said rotary element in such a manner as to cause said first magnetic member and said second magnetic member to be rotated simultaneously in opposite directions respectively and at the same speed as long as the rotary element rotates at a constant speed, said last means including an over-running clutch device whereby said second magnetic member and said fly-wheel may rotate faster than said first magnetic member when said rotary element rotatively decelerates at a rate exceeding a certain rate, said second magnetic member being effective while rotating at least a predetermined amount faster than said first magnetic member to cause an unbalanced torque force to be exerted effective to displace said armature member out of its normal stationary position, and means operatively responsive to the movement of said armature member.

3. A device for detecting the rate of deceleration of a rotary element, said device comprising, in combination, a rotary armature member, a first magnetic member associated with said rotary armature member in such a manner as to cause a torque to be exerted on said armature member tending to rotate it in a corresponding direction and with a force substantially proportional to the speed of rotation thereof, means for causing said first magnetic member to be rotated at all times in accordance with the speed of rotation of said rotary element, a second magnetic member associated with said armature member in a manner to cause a torque to be exerted on said armature member tending to rotate it in a corresponding direction and with a force substantially proportional to the speed of rotation thereof, a fly-wheel rotatable with the second magnetic member, means for causing said second magnetic member and said fly-wheel to be rotated simultaneously with said first magnetic member but in the opposite direction in response to rotation of said rotary element and including an over-running clutch device for permitting said second magnetic member and fly-wheel to rotate faster than said first magnetic member, means for causing said fly-wheel and second magnetic member to be rotatively decelerated at a certain rate when the driving force exerted thereon is removed, and means operatively responsive to the rotative movement of the said armature member resulting from the unbalanced torque force exerted on the armature member when said rotary element rotatively decelerates at a rate greater than said certain rate.

4. Apparatus for detecting the rate of change of speed of a rotary element, said apparatus comprising, in combination, a rotary armature member of non-magnetic material, two rotary magnetic members associated with said armature member and effective respectively upon rotation to exert a torque tending to rotatively displace the armature member in the direction of rotation of the corresponding magnetic member, means establishing a driving connection between said rotary element and said two rotary magnetic members whereby said rotary magnetic members are rotated simultaneously in opposite directions and are effective to exert substantially equal and opposing torques on the armature member as long as they rotate at substantially the same speed, said driving mechanism including means whereby one of said rotary magnetic members is operative in response to inertia effect thereof to rotate at a different speed than the other rotary magnetic member when the rotary element changes its speed of rotation, said two rotary magnetic members being effective upon rotation at different speeds to produce an unbalanced torque on said armature member effective to displace it rotatively, and means responsive to the rotative movement of the armature member.

5. Apparatus for detecting the rate of change of speed of a rotary element, said apparatus comprising, in combination, a rotary armature member of non-magnetic material, a first rotary member having a magnetic portion including pole-pieces of opposite polarity associated with said armature member in a manner to induce eddy currents in the armature member whereby to cause a torque to be exerted on the armature member tending to displace it rotatively in the direction of rotation of the rotary member, a second rotary member having a fly-wheel and a magnetic portion including pole-pieces of opposite polarity associated with the armature member in a manner to induce eddy currents therein whereby a torque is exerted on the armature member tending to rotatively displace it in the direction of rotation of the said second rotary member, drive mechanism connecting said two rotary members to said rotary element and effective to cause rotation of said rotary magnetic members simultaneously in opposite directions at the same speed as long as the rotary element rotates at a constant speed whereby equal and opposing torques are exerted on said armature by said rotary members, said drive mechanism including an overrunning clutch device whereby the one of said rotary members having the fly-wheel may rotate at a different speed from the other rotary member upon a change in speed of the rotary element, said rotary members being effective upon rotation at different speeds to produce an unbalanced torque on said rotary armature member effective to displace it rotatively, and means responsive to the rotative movement of the armature member.

6. Apparatus for detecting variations in the rate of change of speed of a rotary element, said apparatus comprising a rotary armature member, two rotary magnetic members disposed adjacent said armature member and respectively effective, when rotated at the same speed, to exert substantially equal torques on said armature member, driving means for rotating said two rotary magnetic members simultaneously in opposite directions, respectively, at speeds corresponding to the speed of said rotary element, inertia means operative to cause one of said two rotary magnetic members to rotate at a speed in excess of the speed of the other, clutch means connected with said driving means for rendering the said inertia means effective when the speed of the rotary element changes at a rate in excess of a predetermined rate, said armature member being thus rotated upon difference in speed of said two rotary magnetic members, and means actuated in response to rotation of said armature member.

7. Apparatus for detecting variations in the rate of change of speed of a rotary element, said apparatus comprising a rotary armature member, two rotary magnetic members so disposed adjacent said armature member as to include said armature member within the magnetic fields thereof, driving mechanism for driving said two rotary magnetic members simultaneously at a speed corresponding to the speed of said rotary element but in opposite directions respectively, auxiliary mechanism associated with said driving mechanism for causing one of said two rotary magnetic members to rotate at a speed greater than the other when the speed of said rotary element changes at a rate above a certain rate, said armature member being thereby affected by the magnetic fields of said two rotary magnetic members so as to be rotatively moved, and control means operated responsive to rotation of said armature member.

8. Apparatus for detecting the rate of deceleration of a rotary member, comprising in combination, a rotary armature member, a first rotary magnetic member, a second rotary magnetic member, each of said rotary magnetic members being magnetically associated with said armature member in a manner to cause a torque to be exerted thereon tending to rotatively move said armature member with a force substantially proportional to the speed of rotation of each magnetic member, driving means for driving said first rotary magnetic member at a speed at all times in accordance with the speed or rate of change of speed of said rotary member, a fly-wheel rotatable with said second rotary magnetic member, means including an over-running clutch device for causing said second rotary magnetic member and fly-wheel to be rotated by said driving means simultaneously with the said first rotary magnetic member but in a direction opposite to the direction of rotation of said first rotary magnetic member, whereby when said magnetic members are rotating at the same speed they produce substantially equal and opposite torques on said armature member which will thereby remain stationary in a certain position, damping vanes carried by said fly-wheel for causing said second rotary magnetic member and fly-wheel to be rotatively decelerated at a certain rate, which is less than the rate of rotative deceleration of said first rotary magnetic member when said rotary member decelerates at a rate exceeding a predetermined rate, said over-running clutch device functioning under such conditions to permit said second rotary magnetic member and fly-wheel to rotate at a speed greater than said first rotary magnetic member so that said second rotary magnetic member causes an unbalanced torque to be exerted on said armature member effective to rotatively displace said armature member out of its certain position, and contact means operated by said armature member when so displaced.

GEORGE K. NEWELL.